Sept. 9, 1969 J. M. ROWELL 3,466,470

SUPERCONDUCTING DEVICE UTILIZING AN ALLOY MATERIAL

Filed June 14, 1966 3 Sheets-Sheet 1

INVENTOR
J. M. ROWELL
BY David P. Kelley
ATTORNEY

SUPERCONDUCTING DEVICE UTILIZING AN ALLOY MATERIAL

Filed June 14, 1966 3 Sheets-Sheet 2

United States Patent Office 3,466,470
Patented Sept. 9, 1969

3,466,470
SUPERCONDUCTING DEVICE UTILIZING AN ALLOY MATERIAL

John M. Rowell, Readington Township, Hunterdon County, N.J., assignor to Bell Telephone Laboratories, Incorporated, Murray Hill and Berkeley Heights, N.J., a corporation of New York Filed June 14, 1966, Ser. No. 557,576
Int. Cl. H03k 3/38
U.S. Cl. 307—306 7 Claims

ABSTRACT OF THE DISCLOSURE

A superconducting device is provided with a strip of superconducting alloy material, the composition of which varies monotonically along the length of the strip. The critical temperature, therefore, also varies monotonically along the strip length. Means are provided for producing a normally conducting to superconducting interface in the strip and for causing the interface to propagate controllably along the strip. The device is useful as an analog to digital converter, a current stabilizer and a current regulator.

This invention relates to superconducting devices and, more particularly, to such devices for use as switches, analog to digital converters, and the like.

A great deal of interest has, of late, been directed to the phenomenon of superconductivity and to possible uses therefor. Inasmuch as the low temperature or cryogenic art has expanded greatly since the advent of the maser, superconductivity has become an important tool rather than a laboratory curiosity. When thin film techniques are utilized, superconducting devices become even more attractive because they can be adapted readily to miniaturization.

The present invention is directed toward the application of superconductivity to a number of devices for use in low temperature systems or miniaturized systems, or both. Among the many applications of the present invention is an analog to digital converter that can readily be fabricated with the process which forms a part of the present invention, and which is quite simple in operation. The principles of the invention may also be utilized to produce current regulation or current stabilization.

In a first illustrative embodiment of the invention, an analog to digital converter is made by the process of evaporating a thin film of suitable superconducting alloy, such as indium-thallium (InTl) on a masked substrate. The alloy, which is initially rich in thallium, is placed in a suitable crucible and heated. Inasmuch as thallium evaporates at a rate approximately one hundred times greater than indium, the initial film deposited on the substrate has a high thallium content. As evaporation continues, the ratio of indium to thallium in the deposited film increases until the final deposition is quite high in indium content. A moving mask is placed over the substrate so that a thin film strip of alloy is deposited on the substrate whose composition varies along its length, one end being an InTl alloy rich in thallium, the other end being an InTl alloy rich in indium. The mask over the substrate defines a plurality of contact arms along the length of the strip.

Inasmuch as the critical current, i.e., the current at which the material switches from super to normal conductivity varies with the material, increasing as the percentage of indium in the strip increases, different values of current will cause the conducting transition to occur at different places along the length of the strip. When an analog current signal is applied to one end of the strip, a voltage appears across the first pair of contact arms when the current reaches the transition value. As the analog current increases, a second voltage appears across the next pair of contacts when the transition current unique to that region of the strip is reached. The process continues as long as the current increases, producing as an output a plurality of voltage increments. As the current decreases, the areas of the strip switch back to superconductivity in reverse sequence. The net result is an output of incremental voltage steps that are a digital or quantized representation of the analog input signal.

In a second illustrative embodiment of the invention, a strip of alloy is deposited by the process described in the foregoing, only the contact arms are eliminated. A pair of sensing coils are located adjacent the strip at a predetermined point, as will be explained hereinafter, and current is applied to one of the coils, functioning as the primary of a transformer. The other coil, which functions as a transformer secondary, is connected to a current control circuit which controls the amount of current applied to the strip. In operation current is applied to one end of the strip, as in the first embodiment. As the current increases, a normal-superconducting interface is established which moves along the strip. As this itnerface passes the region adjacent the coils, it causes a variation in the coupling between the coils and, as a consequence, a change in the current supplied by the secondary coil to the current control circuit, which decreases or halts the increase in current. As a consequence, the arrangement functions as a current regulator. Any change in current, either increase or decrease, will produce a compensating signal applied to the current control circuit. The magnitude of the current level to be maintained is governed by the location of the coils along the strip.

A strip such as is used in the second embodiment inherently functions as a current stabilizer. As current increases, the length of the normally conducting region increases, hence resistance increases, thereby decreasing current.

Since the conductivity of superconducting materials is governed by an applied magnetic field and temperature as well as current, variations of the foregoing embodiments are had by the use of a variable magnetic field. In general it is desirable to maintain temperature constant inasmuch as temperature variation introduces numerous complications, as well as being a rather slow process having an inherent time lag.

It is a feature of the present invention that a thin film strip of superconducting alloy has a composition which varies along its length.

It is another feature of the present invention that such a strip is formed by evaporation of an alloy material, the constituent metals of which have materially different evaporation rates.

The various features and objects of the present invention will be more readily apparent from the following detained description, read in conjunction with the accompanying drawings, in which.

Figure 1:
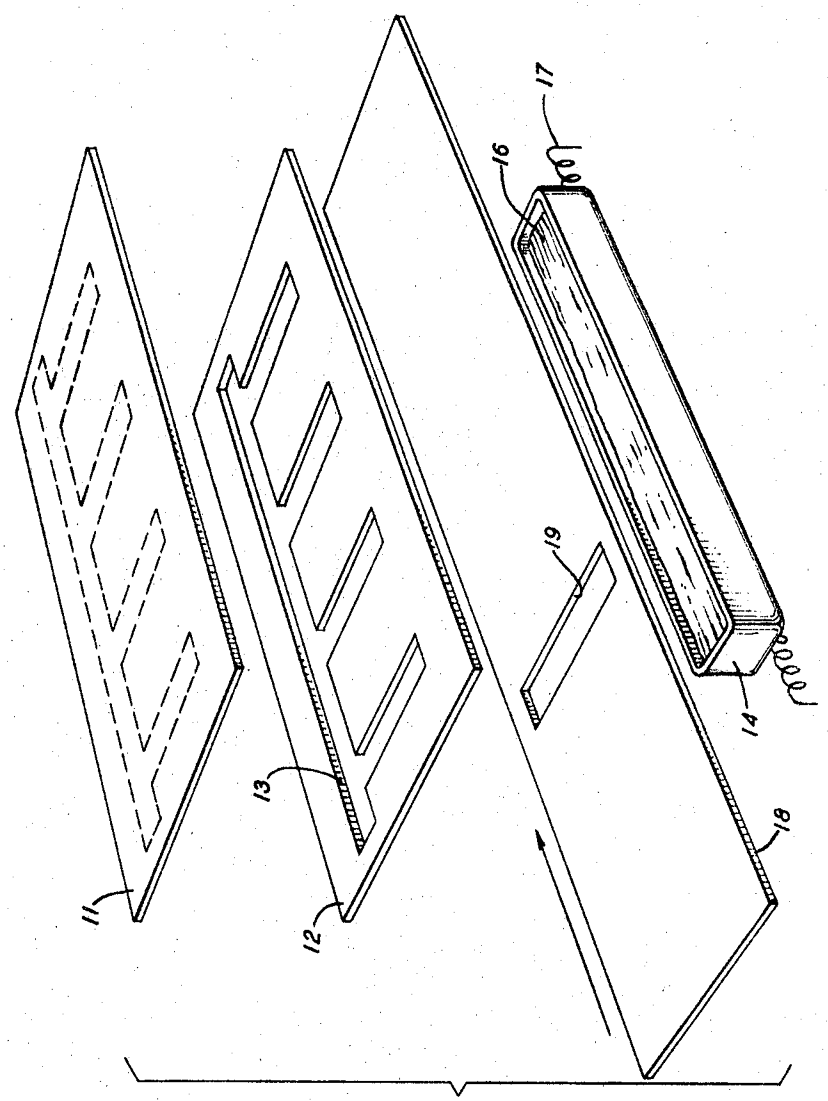
FIG. 1 is an exploded perspective view of apparatus used in the method of the present invention.

In FIG. 1 there are shown certain of the principal elements in the apparatus involved in the production of the superconducting strip of the invention. For clarity the various elements are shown widely separated from each other and not necessarily in their correct proportions.

A substrate 11 of suitable material such as glass, quartz, ruby, or the like has disposed adjacent thereto a mask 12, the cut-out portion 13 of which is shaped to the configuration of the strip or film to be deposited on the substrate. A crucible or boat 14 of carbon or other material carries an alloy solution 16 of the constituent materials to be evaporated. For purposes of illustration, alloy 16 may be a 50-50 solution of indium and thallium. As will be discussed hereinafter, numerous other materials may be used in the achievement of the desired ends. The material 16 carried in boat 14 is heated to evaporation temperature by any suitable means, depicted schematically as heater coil 17.

Interposed between crucible 14 and mask 12 is a mask 18 having a slot 19 therein which is adapted to be moved in translation along the length of mask 12 from one end to the other during the evaporation process, as indicated by the arrow. Any suitable means may be employed to move mask 18 and, for simplicity, such means has not been shown. In addition, for simplicity, no effort has been made to show the housing which contains the apparatus of FIG. 1 and maintains the appropriate atmospheric conditions for the evaporation process.

In operation, the alloy 16 is heated to approximately 500° C. at which point thallium has a vapor pressure of $10^{-3}$ mm. of mercury and indium a vapor pressure of $10^{-7}$ mm. of mercury. As a consequence, the thallium evaporates much faster, i.e., by a factor of one hundred or more, than indium. At the start of the evaporation process, the slot 19 is disposed adjacent one end of mask 12 so that initially there is deposited on substrate 11 a film of substantially pure thallium. As evaporation continues, mask 18 and hence slot 19 move along the length of mask 12 while the ratio of indium to thallium in the deposited strip gradually increases.

The ratio of indium to thallium at the other end of the strip is governed by the use to which the strip is to be put. A useful ratio is twenty percent by weight of indium to eighty percent thallium. Thus the strip as finally deposited on substrate 11, as shown by the dashed lines, at one end is devoid of indium and at the other end contains twenty percent indium, with a smoothly varying (i.e., monotonically varying) amount of indium along its length. As an example of the dimensions involved, the deposited strip may be approximately 1000 Angstroms thick and a millimeter wide.

Figure 2:
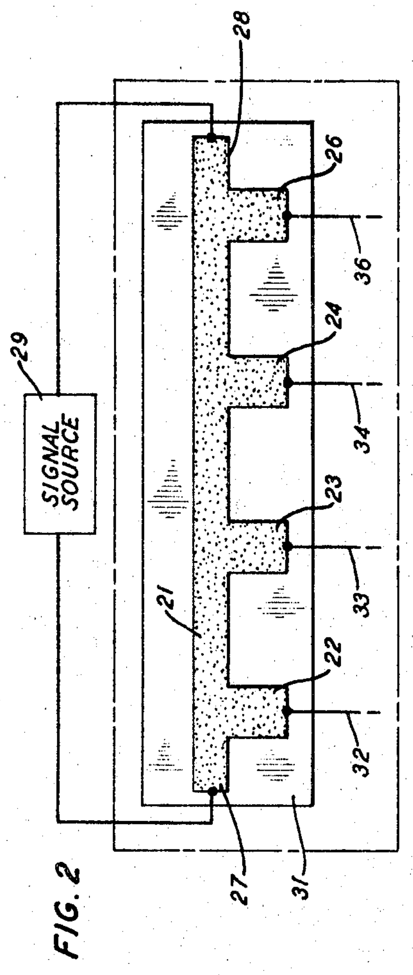
FIG. 2 is a plan view of an illustrative embodiment of the invention.

In FIG. 2 there is shown an illustrative embodiment of the invention wherein a strip formed in the manner discussed in connection with FIG. 1 is utilized as an analog to digital converter or signal quantizer. The device of FIG. 2 comprises a thin film strip 21 of varying superconducting alloy having a plurality of terminal arms 22, 23, 24, and 26 as well as a signal input terminal 27 and an output terminal 28. Terminals 27 and 28 are connected to a signal current source 29. Strip 21 and its terminals are deposited on a substrate 31 of suitable material, such as, for example, quartz.

Each of terminals 22 through 26 is connected through suitable leads 32, 33, 34, and 36 is a utilization device or devices, which, for simplicity, has not been shown.

Figure 3:
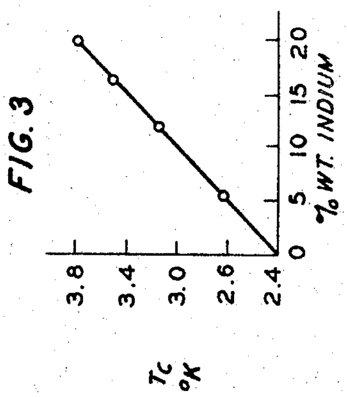
FIG. 3 is a diagram illustrating certain characteristics of the device of the invention.

In FIG. 3 there is shown a diagram of the critical temperature $T_c$ of the strip 21 versus the percent by weight of, for example, indium, where the other constituent material is thallium. It can be seen that the critical temperature increases as a straight line function of the percent of indium. The critical current $I_c$ likewise behaves approximately as a straight line function of the percent of indium. In the arrangement of FIG. 2, the strip 21 is maintanned at superconducting temperatures by any suitable means depicted in dashed outline only. Where the material of strip 21 is an alloy of indium and thallium, it is necessary that the temperature be below 2.4° K. Where a temperature this low is difficult to achieve, other materials may be used. Thus the strip may be formed by the process discussed heretofore of indium and lead, InPb, or indium and tin, InSn, or tin and lead, SnPb. In InPb, the percent by weight of indium would vary, for example, from zero to fifty-five percent. Where lead is a constituent metal, the device needs to be maintained at 4.2° K., the boiling temperature of liquid helium.

Figure 4:
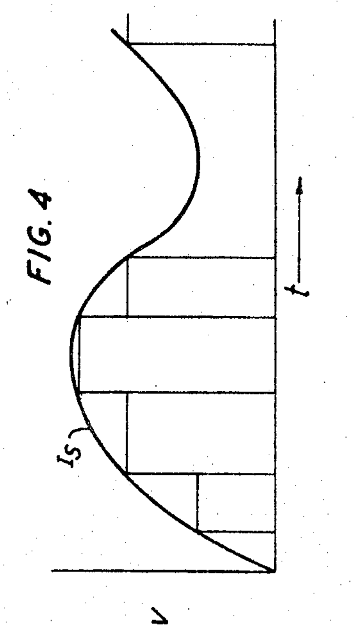
FIG. 4 is a diagram illustrating the behavior of the device of FIG. 2.

When a current is applied to terminal 27 and passes along strip 21, the device remains superconducting until the critical current for the alloy ratio of that portion of the strip between terminals 22 and 23 is reached, at which current that portion of strip 21 becomes normally conducting and a voltage appears between terminals 22 and 23. As the current increases, voltages appear successively between terminals 23, 24, and 24, 26. FIG. 4 is a diagram of this behavior, representing a voltage versus time characteristic for a signal current $I_s$. The graph of FIG. 4 gives the voltage characteristic of the arrangement of FIG. 2 when the leads 32, 33, 34, and 36 are directed to an adding circuit where each succeeding incremental voltage increase is added on to the already existing voltage. From FIG. 4 it can be seen that the arrangement of FIG. 2 produces a coarse quantization of an analog signal represented by the curve $I_s$. Additional terminals on strip 21 give increasingly finer quantization.

The arrangement of FIG. 2 is readily adaptable to other uses. Thus where it is desired simply to prevent the signal current from damaging subsequent equipment, the arrangement can be made to function as an overload protector, the maximum allowable current being governed by which two terminals are chosen as the overload voltage signal output. Where source 29 supplies an already quantized or step current signal, the arrangement of FIG. 2 can be used as an encoder, with individual voltage pulses appearing between successive terminals, the number of pulses being a direct indication of the magnitude of the input signal.

Inasmuch as superconductivity can be regulated by a magnetic field as well as by current, the arrangement of FIG. 2 can be modified by applying the signal current to a coil and having a small sensing current pass along strip 21. Changes in the field generated by the coil due to changes in the signal current produce shifts in the normal-superconducting interface along the length of the strip to produce the same result as is shown in FIG. 4 for example.

Figure 5:
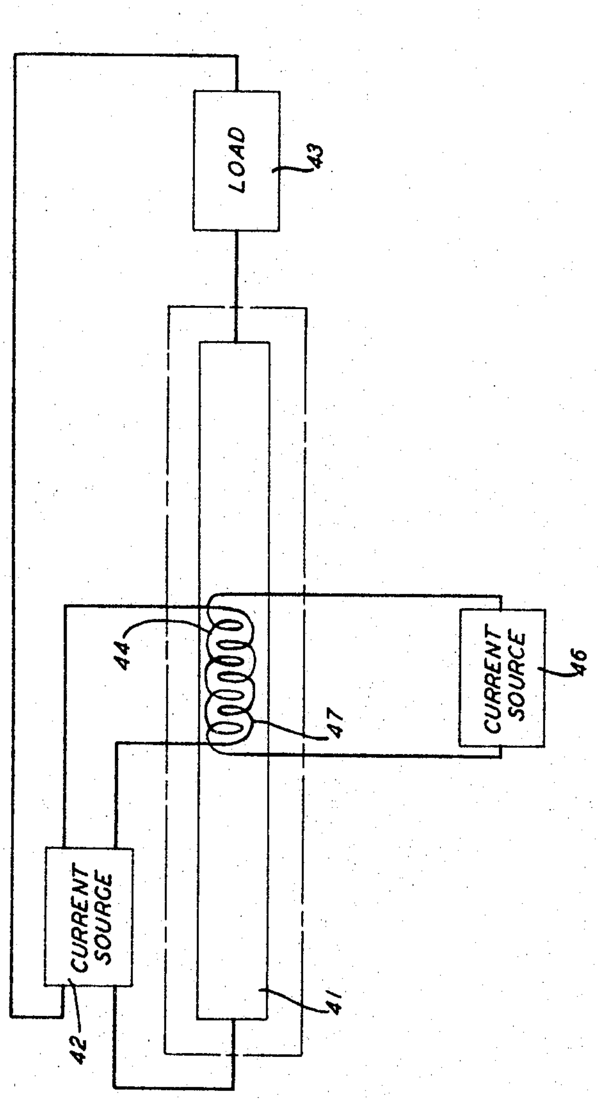
FIG. 5 is a plan view of another illustrative embodiment of the invention.

The fact that the normal-superconducting interface moves back and forth along the strip of the invention in accordance with changes in current, magnetic field, or temperature makes it possible to regulate the current supplied to the strip. In FIG. 5 there is shown a current regulation arrangement which comprises a strip 41 of varying superconducting alloy laid down in accordance with the steps described in connection with FIG. 1 and maintained at superconducting temperatures by suitable means, shown in dashed outline. For simplicity the substrate upon which strip 41 is deposited has not been shown. A current source 42 supplies current to strip 41 and a load or utilization device or circuit 43 in series therewith.

Closely adjacent strip 41 is a first coil 44 which is supplied with current from an A.C. source 46. Adjacent to or interwound with coil 44 is a second coil 47 which is connected to current source 42. In the configuration shown, coil 44 functions as the primary and coil 47 the secondary of a transformer. The location of coils 44 and 47 along the strip 41 is determined by the desired current level. Thus it is desirable that coils 44 and 47 be adjustable in translation.

In operation, the coils 44 and 47 are positioned so that the normal-superconducting interface falls, for example, approximately mid-way between the ends of the coils. The A.C. control current produced in secondary 47 by source 46 and primary 44 is such that it tends to keep the D.C. current from source 42 at the desired value. Any change in load 43, for example, produces a change in the current flowing through strip 41, and hence a movement or shift of the normal-superconducting interface. The movement in the interface produces a change in the coupling between coils 44 and 47, with a corresponding change in the secondary current applied to source 42. The coils are so wound that this change in current is in a direction to produce a corresponding change in the current output of source 42 to correct the initial change in current caused by the change in load. The manner in which the secondary current produces the change in output of source 42 may be any one of a number of ways known in the art. The net result is that the interface is relocated in its equilibrium position and the current fed to load 43 remains substantially constant.

An arrangement similar to that of FIG. 5 may be used to regulate a magnetic field, as in the case of a superconducting solenoid, by using source 46 and coils 44 and 47 to control the current through the solenoid and hence its field. In this case changes in the field are quickly corrected. It is also possible to utilize voltage taps of the type shown in FIG. 2 to generate a correcting signal. In addition, the strip alone can be used to regulate the solenoid current by being placed in series therewith, and sensing the magnetic field.

As was pointed out before, just the simple strip of FIGS. 2 or 5 inherently affords some measure of current control. As current from a source increases, the length of the normally conducting portion of the strip increases, causing an increase in resistance and a consequent decrease in current.

The foregoing has been for purposes of illustrating the principles of the invention. Various changes and modifications in the method of making the strip and the uses to which it is put may occur to workers in the art without departure from the spirit and scope of the invention.

What is claimed is:

1. Superconducting apparatus comprising a strip of superconducting alloy material, the alloy having a composition that varies monotonically along the length of said strip, means for maintaining said strip at a superconducting temperature, and means for producing a normally conducting to superconducting interface in said strip and for causing said interface to propagate controllably along said strip.

2. The apparatus as claimed in claim 1 wherein the constituent materials of said alloy material have substantially different evaporation rates at elevated temperatures.

3. In combination, superconducting apparatus comprising a strip of superconducting alloy material, the alloy composition of said strip varying monotonically along the length thereof, means for maintaining said strip in a superconducting state, means for producing a transition in the strip to a normal conducting state at a point along the length thereof and for causing the point of transition to propagate controllably along said strip, and means positioned along the length of said strip for indicating the conducting state of said strip at at least one region along its length.

4. The combination as claimed in claim 3 wherein said last mentioned means comprises a plurality of voltage terminals spaced along the lengths of said strip.

5. The combination as claimed in claim 3 wherein said last mentioned means comprises a pair of sensing coils adjacent said strip and means for supplying a current to one of said coils.

6. Superconducting apparatus for detecting changes in current applied thereto comprising a strip of superconducting alloy material, the alloy composition of said strip varying monotonically along the length thereof, means for maintaining said strip in a superconducting state, a source of current for applying current to said strip to create therein a normal conducting to superconducting interface and to cause said interface to propagate controllably along said strip, and means for producing output signals from said strip in response to changes in current from said source.

7. The apparatus as claimed in claim 6 and further including means for applying the output signals to said current source to counteract the change in current from said source.

References Cited

UNITED STATES PATENTS

| | | | |
|---|---|---|---|
| 3,181,936 | 5/1965 | Denny | 29—599 |
| 3,047,743 | 7/1962 | Brennemann | 307—212 |

OTHER REFERENCES

Superconductivity by D. Shoenberg, University Press, Cambridge, 1960, pages 10, 44 and 45.

ARTHUR GAUSS, Primary Examiner

B. P. DAVIS, Assistant Examiner

U.S. Cl. X.R.

29—599; 307—229, 297; 338—32